(12) United States Patent
Xiang et al.

(10) Patent No.: US 8,241,776 B2
(45) Date of Patent: Aug. 14, 2012

(54) BATTERY COVER

(75) Inventors: Jinliang Xiang, Shenzhen (CN); Xiaoli Cai, Shenzhen (CN)

(73) Assignee: BYD Company Limited (CN)

( * ) Notice: Subject to any disclaimer, the term of this patent is extended or adjusted under 35 U.S.C. 154(b) by 980 days.

(21) Appl. No.: 12/247,425

(22) Filed: Oct. 8, 2008

(65) Prior Publication Data

US 2009/0142661 A1 Jun. 4, 2009

(30) Foreign Application Priority Data

Dec. 3, 2007 (CN) .................. 2007 2 0183467 U

(51) Int. Cl.
*H01M 2/02* (2006.01)
*H01M 2/10* (2006.01)

(52) U.S. Cl. .................. 429/100; 429/163; 429/185

(58) Field of Classification Search .................. 429/96, 429/100, 163, 175, 176, 185
See application file for complete search history.

(56) References Cited

U.S. PATENT DOCUMENTS

| | | | |
|---|---|---|---|
| 3,648,337 A * | 3/1972 | Greskamp et al. | ........... 29/25.42 |
| 5,796,588 A | 8/1998 | Machida | |
| 7,129,001 B2 | 10/2006 | Munenaga et al. | |
| 7,968,817 B2 * | 6/2011 | Freitag et al. | ............ 219/121.64 |
| 2006/0088761 A1 | 4/2006 | Ota | |
| 2009/0108808 A1 | 4/2009 | He et al. | |
| 2009/0136836 A1 | 5/2009 | Xu et al. | |
| 2009/0142659 A1 | 6/2009 | Lai et al. | |

FOREIGN PATENT DOCUMENTS

| | | |
|---|---|---|
| CN | 1304559 | 7/2001 |
| CN | 2829107 | 10/2006 |
| CN | 101075667 | 11/2007 |
| CN | 201122609 | 9/2008 |
| CN | 201122624 | 9/2008 |
| CN | 101425678 | 5/2009 |
| DE | 10100626 | 8/2001 |
| JP | 56167267 | 12/1981 |
| JP | 59121778 | 7/1984 |
| JP | 09103034 | 4/1997 |

OTHER PUBLICATIONS

European Search Report for EP08400053 (mailed Apr. 3, 2009).
USPTO Transaction History of U.S. Appl. No. 12/247,111, filed Oct. 7, 2008, entitled "Battery Spacer."
USPTO Transaction History of U.S. Appl. No. 12/255,844, filed Oct. 22, 2008, entitled "Battery Protection Mechanism."
USPTO Transaction History of U.S. Appl. No. 12/256,769, filed Oct. 23, 2008, entitled "Battery Electrode Structure."

* cited by examiner

*Primary Examiner* — Tracy Dove
(74) *Attorney, Agent, or Firm* — Greenberg Traurig, LLP

(57) ABSTRACT

Described is a battery cover having upper and lower shells that can be coupled to each other to protect the battery's core and internal circuit board. The shells can be ultrasonically welded to provide at least one loop of continuous weld. Once welded together, the cover reduces battery's exposure to moisture and other external element leading to reduced electrical shorts and improved safety and efficiency.

13 Claims, 3 Drawing Sheets

BATTERY COVER

CROSS-REFERENCE TO PRIOR APPLICATIONS

This application claims priority to Chinese Patent Application No. 200720183467.X, filed Dec. 3, 2007.

FIELD OF THE INVENTION

The embodiments of the present invention relate to battery covers.

BACKGROUND

During the battery manufacturing process, the cell core and circuit board have to be protected within a cover that is capable of securing the cell core and protecting the electronic functions of the circuit board. The cover may include an upper shell and a lower shell that can be welded together to produce a compartment for housing the cell core and circuit board. However, most of these methods are more concerned about the process of joining the two shells and fail to take into account potential exposures to water and moisture. Furthermore, to reduce cost and increase efficiency, the welding of the upper and lower shells may not be continuous. As such, poor coupling between the shells may lead to water seepage causing shorts and possible explosion of the battery.

SUMMARY

Accordingly, a first embodiment of the present invention discloses a battery cover comprising: an upper shell and a lower shell coupled to the upper shell using at least one loop of continuous weld, wherein the shells are configured to create a compartment for receiving a cell core and a circuit board. The shells can be formed of resin or plastic material and can further include adhesives to facilitate coupling of the shells to each other.

A second embodiment discloses a battery cover comprising: a first shell having a first tab with a first bond wire and a first recess with a second bond wire, and a second shell having a second tab and a second recess, the second shell adaptable to be coupled to the first shell, wherein the first recess is configured to receive the second tab and the second recess is configured to receive the first tab, the first and second bond wires operable to form at least one loop of continuous weld. The bond wires may have rectangular, triangular or trapezoidal cross-sections. Furthermore, adhesives may also be used to facilitate coupling of the shells. Like above, the shells can be formed of resin or plastic material and take on rectangular or circular shapes. In one instance, the shells can be coupled using ultrasonic welding, wherein the shells are configured to create a compartment for receiving a cell core and a circuit board.

Other variations, embodiments and features of the present invention will become evident from the following detailed description, drawings and claims.

DETAILED DESCRIPTION

Figure 1:
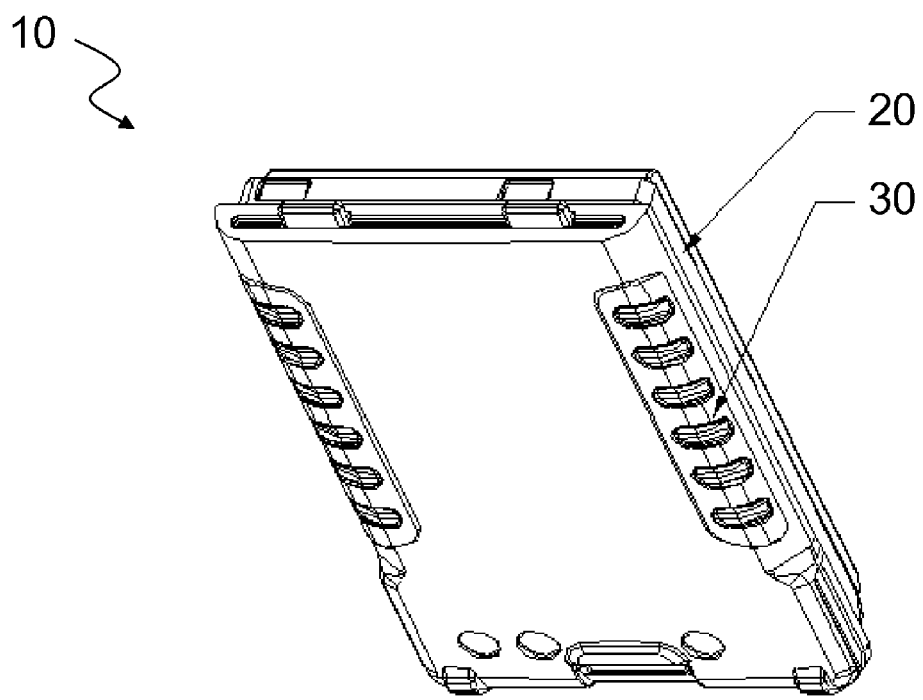
FIG. 1 illustrates a battery cover having upper and lower shells.

It will be appreciated by those of ordinary skill in the art that the invention can be embodied in other specific forms without departing from the spirit or essential character thereof. The presently disclosed embodiments are therefore considered in all respects to be illustrative and not restrictive.

Reference is made to FIGS. 1-5 illustrating a first embodiment of a battery cover 10 having an upper shell 20 and a lower shell 30. The shells 20, 30 can be coupled to each other in order to create a compartment (25, FIG. 4) for receiving a cell core or cell and a circuit board (not shown). The compartment (25, FIG. 4) created by the shells 20, 30 may also be used to store various electronic devices and components. In one embodiment, the shells 20, 30 can take on rectangular, circular or other polygonal shapes and be fabricated of metal, resin, plastic or other suitable material. To reduce cost and simplify the manufacturing process, the shells 20, 30 can be formed of resin or plastic via injection molding technique.

In this instance, the coupling utilizes at least one loop of continuous weld to ensure that the shells 20, 30 are securely fastened to each other. The welding technique can include tin welding, gas welding, electric arc welding, laser welding or ultrasonic welding. In another embodiment, the shells 20, 30 can be formed of resin or plastic material and coupled using ultrasonic welding. In another instance, the shells 20, 30 can be formed of resin or plastic material and coupled using ultrasonic welding with about one to three loops of continuous weld.

Figure 2:
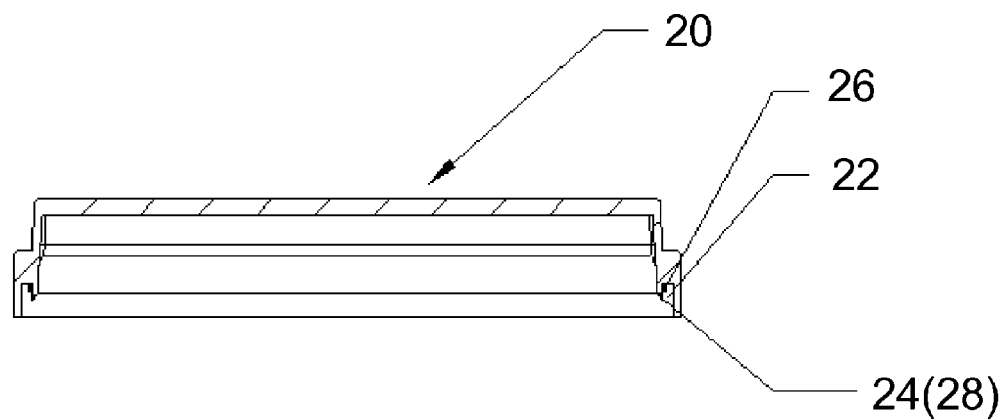
FIG. 2 illustrates a cross-sectional view of the upper shell.
Figure 3:
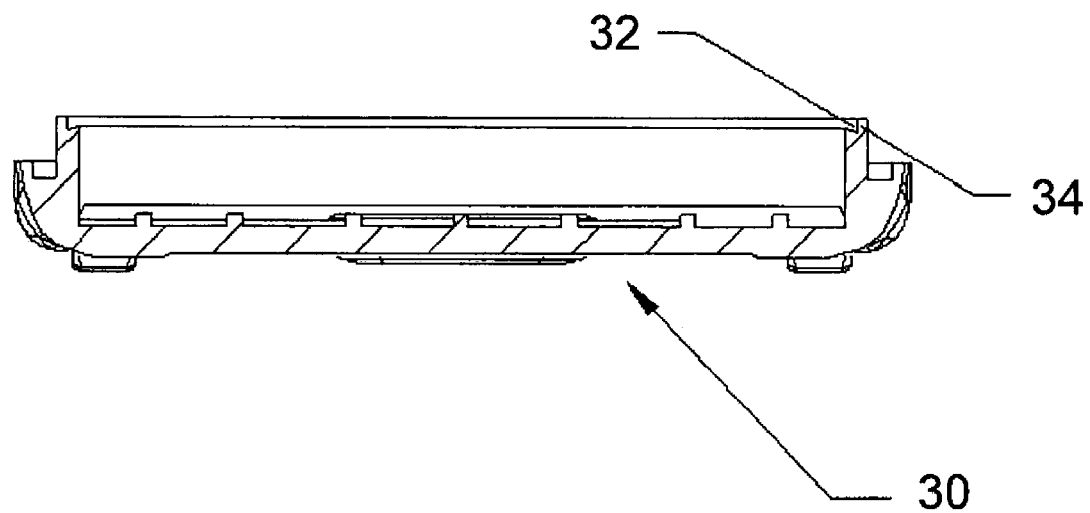
FIG. 3 illustrates a cross-sectional view of the lower shell.

Reference is now made to FIGS. 2-3 illustrating cross-sectional views of the upper and lower shells 20, 30, respectively. As shown, an upper recess 22 and an upper tab 24 are disposed about the edges of the upper shell 20 while a lower recess 32 and a lower tab 34 are disposed about the edges of the lower shell 30. In one instance, the recesses 22, 32 and tabs 24, 34 are continuously disposed about the edges of the shells 20, 30, respectively. In other instances, there may be breaks in the recesses 22, 32 and tabs 24, 34 because of electronic elements (not shown). Furthermore, although only one recess 22, 32 and one tab 24, 34 are shown for each shell 20, 30, there may be multiple recesses 22, 32 and tabs 24, 34.

In one embodiment, the upper recess 22 is adaptable for receiving the lower tab 34 while the lower recess 32 is adaptable for receiving the upper tab 24 to provide a secure coupling between the two shells 20, 30. In another embodiment, a first bond wire 26 is disposed within the upper recess 22 while a second bond wire 28 is disposed about the upper tab 24. In this case, the second bond wire 28 functions as the upper tab 24. Like the recesses 22, 32 and the tabs 24, 34, the bond wires 26, 28 may also be continuously disposed about the upper shell 20. Subsequently when the shells 20, 30 are coupled together using known welding techniques, the first bond wire 26 becomes disposed between the upper recess 22 and the lower tab 34 while the second bond wire 28 becomes disposed between the joining of the lower recess 32 and the upper tab 24. The bond wires 26, 28 facilitate in the joining of the recesses 22, 32 and tabs 24, 34.

Figure 4:
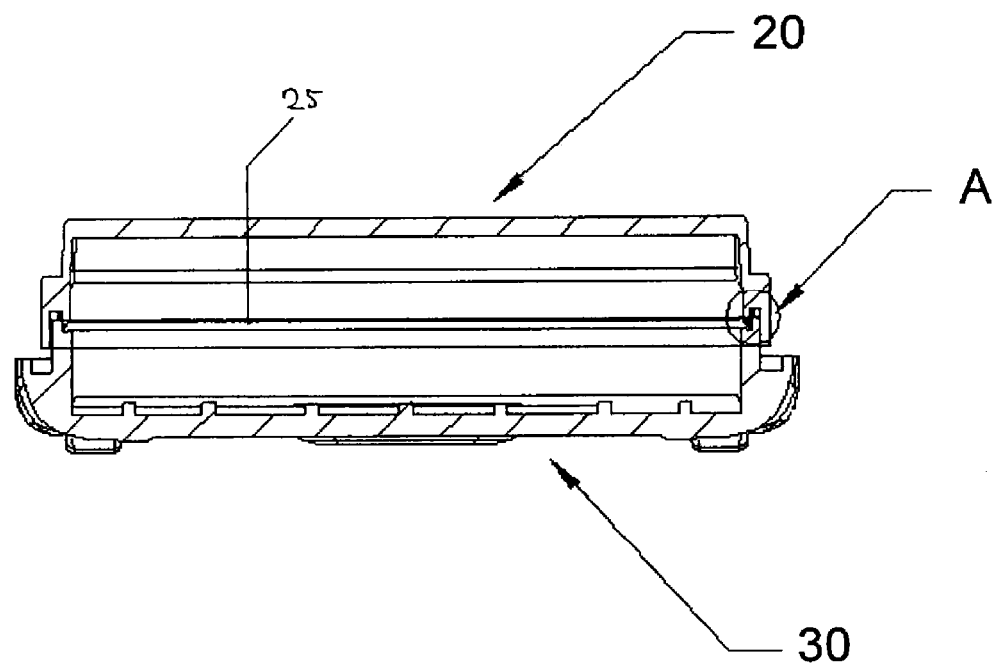
FIG. 4 illustrates a cross-sectional view of FIG. 1.
Figure 5:
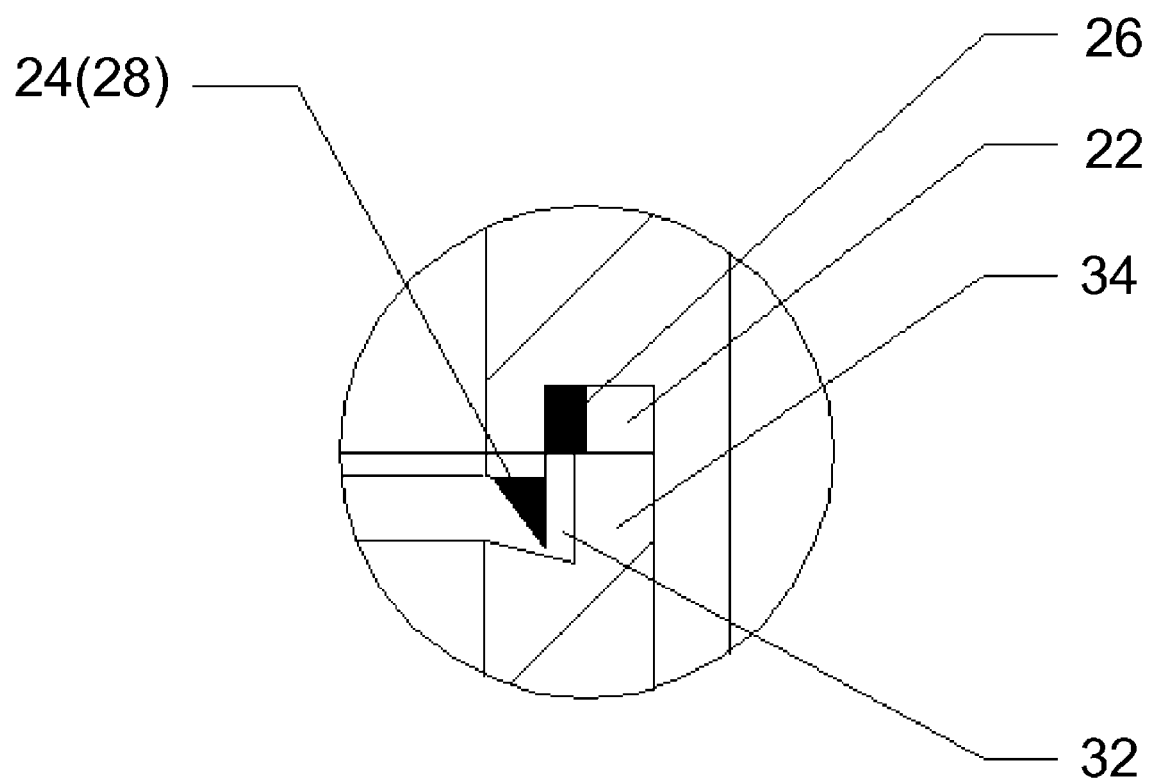
FIG. 5 illustrates an enlarged view of the portion indicated by A in FIG. 4.

Reference is now made to FIGS. 4-5 illustrating cross-sectional views of the battery cover 10 further detailing the coupling between the upper and lower shells 20, 30. As shown, when the upper and lower shells 20, 30 are coupled together using known welding techniques, the lower tab 34 can be received by the upper recess 22 while the upper tab 24 can be received by the lower recess 32 to provide a secure coupling between the two shells 20, 30. In one embodiment, when ultrasonic welding or bonding is utilized, the first and second bond wires 26, 28 disposed about the upper recess 22 and upper tab 24, respectively, are able to be received by the corresponding lower tab 34 and the lower recess 32, respectively. When the shells 20, 30 are welded together, the heat generated is able to cause spill over and fusing of the two bond wires 26, 28 to form one loop of continuous weld. In the alternative, the bond wires 26, 28 may fuse within the respective regions and become two loops of continuous weld. It will be appreciated by one skilled in the art that additional bond wires 26, 28 may be disposed about the recesses 22, 32 or tabs 24, 34 to provide additional loops of continuous weld.

It will be understood that the recesses 22, 32 and the tabs 24, 34 may be freely oriented about the shells 20, 30, respectively. In other words, even though the upper recess 22 is closer to the edge than the upper tab 24 (e.g., the upper tab 24 is surrounded by the upper recess 22), the alternative may be incorporated with the upper recess 22 being enclosed by the upper tab 24. Likewise, the same applies to the lower recess 32 and the lower tab 34. Also, even though the edges of the shells 20, 30 are utilized and shown, the recesses 22, 32 and the tabs 24, 34 may be disposed anywhere about the surfaces of the shells 20, 30 as necessary without restriction.

Likewise, although the bond wires 26, 28 are shown to be disposed about the upper recess 22 and tab 24, respectively, it is understood that the bond wires 26, 28 may also be disposed about the lower recess 32 and tab 34 or any combinations thereof as necessary to provide the necessary coupling. And although the bond wires 26, 28 as shown have rectangular and triangular cross-sections, respectively, it is understood that the bond wires 26, 28 can take other polygonal shapes including trapezoidal cross-sections. The process of coupling the shells 20, 30 with heat or solvents can be accomplished by known welding techniques and will not be discussed in further detail.

In another embodiment, adhesives may be disposed about the recesses 22, 32 to further facilitate the coupling of the shells 20, 30, the adhesives being applied to the upper recess 22, the lower recess 32, or both recesses 22, 32. In addition, adhesives may be applied to the tabs 24, 34.

FIGS. 1-5 illustrates a battery 10 having a cell core, circuit board and shells 20, 30, the cell core and circuit board being situated within the shells 20, 30 whereby the shells 20, 30 are capable of being joined using the presently disclosed embodiments. The types of cell core and circuit board and their usages are known by one skilled in the art and will not be described in further detail. Because the shells 20, 30 are able to form at least one loop of continuous weld, they are able to securely maintain the cell core in its position and protect the circuit board and all of its electronic functions. Furthermore, the shells 20, 30 are able to minimize and protect against water and moisture from coming into contact with the cell core and circuit board thereby reducing the chances of circuits shorting and exploding, thus increasing the safety and efficiency of the battery.

Although the invention has been described in detail with reference to several embodiments, additional variations and modifications exist within the scope and spirit of the invention as described and defined in the following claims.

What is claimed is:

1. A battery cover comprising:
   a first shell having a first tab with a first bond wire and a first recess with a second bond wire; and
   a second shell having a second tab and a second recess, the second shell coupled to the first shell, wherein the first recess receives the second tab and the second recess receives the first tab, the first and second bond wires form at least one loop of continuous weld.

2. The cover of claim 1, wherein the bond wires have rectangular, triangular or trapezoidal cross-sections.

3. The cover of claim 1, wherein the first or second recess further includes adhesives for coupling the shells.

4. The cover of claim 1, wherein the shells are formed of resin or plastic material.

5. The cover of claim 1, wherein the shells are rectangular or circular.

6. The cover of claim 1, wherein the shells are coupled using ultrasonic welding.

7. The cover of claim 1, wherein the shells, when coupled, form a compartment.

8. A battery cover comprising:
   an upper shell having an upper tab with a first bond wire and an upper recess with a second bond wire; and
   a lower shell having a lower tab and a lower recess, the lower shell coupled to the upper shell, wherein the upper recess receives the lower tab and the lower recess receives the upper tab, the first and second bond wires form at least one loop of continuous weld; and
   wherein the shells, when coupled, form a compartment.

9. The cover of claim 8, wherein the bond wires have rectangular, triangular or trapezoidal cross-sections.

10. The cover of claim 8, wherein the upper or lower recess further includes adhesives for coupling the shells.

11. The cover of claim 8, wherein the shells are formed of resin or plastic material.

12. The cover of claim 8, wherein the shells are rectangular or circular.

13. The cover of claim 8, wherein the shells are coupled using ultrasonic welding.

* * * * *